United States Patent
Hayet et al.

(10) Patent No.: US 7,238,647 B2
(45) Date of Patent: *Jul. 3, 2007

(54) METHOD AND FLUID FOR CONTROLLING THE SATURATION OF A FORMATION AROUND A WELL

(75) Inventors: Annie Audibert Hayet, Croissy sur Seine (FR); Jean-Francois Argillier, Saint Cloud (FR); Daniel Longeron, Sartrouville (FR); Carine Dewattines, Belgique (BE); Michel Janssen, Belgique (BE)

(73) Assignees: Institut Francais du Petrole, Rueil Malmaison Cedex (FR); Oleon N.V., Ertvelde (BE)

( * ) Notice: Subject to any disclaimer, the term of this patent is extended or adjusted under 35 U.S.C. 154(b) by 184 days.

This patent is subject to a terminal disclaimer.

(21) Appl. No.: 10/332,068

(22) PCT Filed: Jun. 25, 2001

(86) PCT No.: PCT/FR01/02012

§ 371 (c)(1),
(2), (4) Date: May 19, 2003

(87) PCT Pub. No.: WO02/02713

PCT Pub. Date: Jan. 10, 2002

(65) Prior Publication Data

US 2003/0178230 A1    Sep. 25, 2003

(30) Foreign Application Priority Data

Jul. 5, 2000    (FR) .................................. 00 08707

(51) Int. Cl.
C09K 8/04    (2006.01)
E21B 43/16    (2006.01)

(52) U.S. Cl. ...................... 507/138; 507/139; 507/265; 507/266; 166/305.1

(58) Field of Classification Search .................. 507/138
See application file for complete search history.

(56) References Cited

U.S. PATENT DOCUMENTS

| 2,271,696 | A | * | 2/1942 | Jones ......................... 507/116 |
| 3,379,708 | A | * | 4/1968 | Peacock ..................... 530/232 |
| 3,882,029 | A | | 5/1975 | Fischer et al. |
| 3,979,304 | A | | 9/1976 | Fischer et al. |
| 4,409,108 | A | * | 10/1983 | Carney et al. .............. 507/138 |
| 5,618,780 | A | * | 4/1997 | Argillier et al. ............ 508/503 |
| 6,740,625 | B1 | * | 5/2004 | Audibert et al. ............ 507/138 |

FOREIGN PATENT DOCUMENTS

| EP | 0398113 | 11/1990 |
| GB | 2283036 | 4/1995 |
| WO | 9640835 | 12/1996 |

* cited by examiner

*Primary Examiner*—Randy Gulakowski
*Assistant Examiner*—Timothy J. Kugel
(74) *Attorney, Agent, or Firm*—Antonelli, Terry, Stout & Kraus, LLP.

(57) ABSTRACT

The present invention relates to a method and to a fluid for drilling or workover in a well running through a porous permeable formation, wherein a water-based well fluid circulates in said well. In the method, at most 3% by weight of a composition obtained from fat, or an oil, and an alcohol, is added to the fluid in addition to the conventional constituents for such a fluid, the chain lengths of the acid and alcohol parts being chosen such that the ester thus obtained has sufficient dispersion in water, compatibility with said constituents, does not form an emulsion with the reservoir oil and adsorbs sufficiently on the porous formation.

37 Claims, 1 Drawing Sheet ns. 25, 2001 and claims benefit under 35
METHOD AND FLUID FOR CONTROLLING THE SATURATION OF A FORMATION AROUND A WELL This application is a national stage application under 35 U.S.C. §371 of international application no. PCT/FR01/02012, filed Jun. 25, 2001 and claims benefit under 35 U.S.C. §119 of the filing date of French patent application no. FR 00/08707, filed Jul. 5, 2000.

FIELD OF THE INVENTION

The present invention relates to the field of drilling, or more generally to the field of operations requiring circulation of a fluid in a drilled well, said fluid being in contact with the porous and permeable rock walls. During these operations, the circulating fluid penetrates the thickness of the wall to a greater or lesser degree depending on the more or less high efficiency of the filtrate-reducing additives that can be added to the fluid. It is known that the "filtrate" (volume of fluid penetrating the rock) can cause the well wall to clog to varying degrees. If the well passes through a hydrocarbon producing area, productivity can be seriously impaired. The present invention proposes a fluid and a method for drilling a well, or servicing in a drain hole intended for starting production of a hydrocarbon producing formation while favouring the flow of these hydrocarbons to the well.

The fluid used when drilling a well circulates along the formation under overpressure in relation to the pressure of the formation. This enables inflow phenomena to be limited and the stability of the well walls to be controlled. Filtration phenomena occur, leading to the formation of a filter cake. Depending on the circulation conditions (whether or not mud is circulating in the well), an external and internal cake, or just an internal cake, forms during the period referred to as "spurt" period. This very low permeability cake protects the formation, and in particular the reservoir rock, from invasion by the constituents of the drilling mud. However, recent studies (A. Audibert, J-F Argillier, H. Ladva, Way P., Hove A. "Role of Polymers on Formation Damage" SPE 54767 presented to the SPE Formation Damage, The Hague, 1999) show that a zone is formed, beyond the internal cake, invaded by certain mud components. In particular, in the case of an oil reservoir drilled with water mud, invasion of the reservoir, beyond the internal cake, by a fraction of the polymers contained in the mud is observed. These hydrophilic polymers that are not held back in the cake become adsorbed in the pores of the rock, thus reducing the oil permeability of the rock. This phenomenon is more significant in the vicinity of the well, and causes water saturation to increase near the well.

The invention applies advantageously to water-containing mud formulations proposed for crossing reservoirs, more generally known as "drill-in fluids" (described for example in the document "Drill-in Fluids Control Formation Damage" by Halliday W. S., World Oil, December 1994, 43–47).

Well fluids are complex fluids whose main functions are notably to participate in cleaning the well during drilling or after it has been drilled (completion fluids), apply a sufficient hydraulic pressure to ensure the safety of the well, stabilize the well walls, lubricate the casing strings or drill strings, or enable equipment to be set up at the bottom or the production process to be implemented (completion fluids). To fulfil these functions, the based fluid, water in this case, has specific products added to it to regulate the rheology, density, cleaning ability, and filtrate control, for example. No well fluid additive that has a direct effect on the saturation of the rock in contact with the fluid is known.

BACKGROUND OF THE INVENTION

Document GB-A-2,283,036 discloses water-based drilling fluids containing a polyalkylene glycol and an ester that can be a partial ester of a polyol with a fatty acid; it is claimed that these fluids are intended to be used in formations of clayey shales and clays, and that they combine a high lubricity and a high shale inhibiting power. The examples disclose the following partial esters:
glyceryl monooleate;
tetraethylene glycol monooleate; and
glyceryl monoricinoleate.

However, example 7 clearly shows that addition of less than 3% by weight of mixture (2.25% by weight polyalkylene glycol and 0.75% by weight glycerol monooleate) does not provide high lubricity properties.

Document U.S. Pat. No. 5,318,956 (corresponding to document EP-A-0,398,113) discloses the use of esters of monofunctional or polyfunctional alcohol with saturated or unsaturated carboxylic acids up to C36 as the main constituent of the oil phase of drilling fluids of "oil-in-water" (O/W) emulsion type.

Document U.S. Pat. No. 3,882,029 discloses a completion and workover fluid comprising finely divided solid particles consisting of a homogeneous solid solution of:
wax;
a partial ester of glycerol or sorbitan with a high saturated fatty acid (C12–C20), which is oil-soluble and has surfactant properties;
a monoester of polyethylene glycol with a high saturated fatty acid (C12–C20), dispersible in water and having surfactant properties;
an ethylene-vinyl acetate copolymer; and
a fatty alcohol.

Document U.S. Pat. No. 3,979,304 discloses a method for reducing the permeability of permeable underground formations, which consists in adding to the drilling fluid particles of a homogeneous solid solution comprising:
a wax;
a partial ester of a polyhydroxyl compound with a high fatty acid (C12–C20), which is oil-soluble and has surfactant properties;
a water-soluble surfactant, that can be a monoester of polyethylene glycol with a high fatty acid (C12–C20).

Document WO-A-96/40,835 discloses "oil-in-water" (O/W) emulsions comprising a brine, a C7–C23 fatty acid triglyceride, an alcohol, an emulsifier and a sulfur-containing compound.

SUMMARY OF THE INVENTION

An object of the present invention is to provide a drilling or workover process using a water-based fluid that comprises an additive allowing to reduce or to prevent reservoir damage. A further object is to provide such a process wherein the water-based fluid comprises an additive that can directly pass into the filtrate and be sufficiently adsorbed on the reservoir rock. A still further object is to provide said fluids.

Thus, the present invention relates to a drilling or workover process in which a fluid is made to circulate in a well drilled in a hydrocarbon reservoir rock. It also relates to the fluid and to the use thereof in the process of the invention. The fluid is water-based, excluding fluids known in the trade as "oil-in-water" (O/W) emulsions; in fact, the emulsion would have the effect of clogging the pores and thus preventing passage of the additive through the cake, which is contrary to one of the objectives of the invention. The fluid includes all of the additives required for the functions of a drilling and/or workover fluid, and a sufficient quantity, at most 3% by weight, preferably less than 0.1% by weight, of one or more compounds selected from the group consisting of partial esters of polyols and C6–C22 fatty acids. In particular, the partial ester is preferably added in form of a concentrated composition based on partial ester, added in such a way that the partial ester is at a concentration of about 1 g/l in the fluid.

Surprisingly, the use of such additives in drilling and/or workover fluids allows to reduce and to prevent damage to the reservoir during the drilling and/or workover stages (up to and including recovery stages referred to as primary) in wells drilled in hydrocarbon reservoir rocks. Of course, the nature of these additives is determined according to the particular nature of the water-based well fluids that contain other additives with which the additive according to the invention must be compatible, i.e. not impede the functions of the other additives or components of the well fluid.

Furthermore, the flash point (measured according to the ASTM D92 standard method) is preferably at least 100° C. or even better, at least 150° C.

As for the polyols forming the partial esters used in the present invention, they include diols, triols, polyols, as well as mixed polyalkoxides and polyol mixtures.

The following may be mentioned in particular:
glycerol: $HOCH_2$—$CHOH$—$CH_2OH$;
diglycerol:
    $HOCH_2$—$CHOH$—$CH_2$—$O$—$CH_2$—$CHOH$—$CH_2OH$;
polyglycerols:
    $HOCH_2$—$CHOH$—$CH_2$—$(OCH_2$—$CHOH$—$CH_2)_n$—$OCH_2$—$CHOH$—$CH_2OH$
    where n is between 1 and 8, preferably between 1 and 4;
trimethylolpropane: $HOCH_2CH_2$—$CHCH_2OH$—$CH_2CH_2OH$;
pentaerythritol: $C(CH_2OH)_4$;
ethylene glycol: $HOCH_2CH_2OH$;
polyethylene glycols: $H(OCH_2CH_2)_nOH$,
    where n is between 2 and 30, preferably between 2 and 12,
propylene glycol: $CH_3$—$CHOH$—$CH_2OH$;
polypropylene glycols: $H(OCH(CH_3)CH_2)_nOH$,
    where n is between 2 and 30, preferably between 2 and 12, and
polyethylene glycol-polypropylene glycol mixtures.

The fatty acids forming the partial esters used in the present invention have a chain length ranging between C6 and C22, preferably between C6 and C12, or better between C8 and C10. These chains can be linear or branched, saturated or unsaturated, of natural or synthetic origin. Mixtures of fatty acids, preferably of natural origin, with chain lengths essentially ranging between these limits, are generally used.

The esters used in the present invention are partial esters: they comprise at least one free hydroxyl group and at least one hydroxyl group esterified by a fatty acid. The molar ratio of the number of free hydroxyl groups to the number of hydroxyl groups esterified by a fatty acid is preferably at least 1:1, a preferred ratio being at least 2:1, a more preferred ratio being at least 3:1.

The partial ester used in the present invention can be obtained by glycerolysis, by direct esterification or by transesterification from a fat (or an oil) and an alcohol. All the vegetable or animals fats are suitable, insofar as they have a chain length essentially ranging between C6 and C22, preferably between C6 and C12, or even better between C8 and C10. What is referred to as fat (or oil) includes the triglycerides, the fatty acids as well as the methyl esters. The whole equivalent ricin range is also included therein.

The additive composition according to the invention combines the various properties required for its maximum efficiency, particularly with regard to the change in wettability of the rock.

In other words, the additive composition has the following features, detailed below:
good dispersion in the water of the well fluid, i.e. sufficient water solubility, even if not total,
very good compatibility with the water-based fluid, i.e. does not interfere with the properties required by the fluid, provided by other compounds or additives,
capacity to pass directly into the filtrate, i.e. without being held back or blocked in the cake that may form on the well wall,
when present in the aqueous filtrate, does not entail the formation of an emulsion between said aqueous filtrate and the reservoir oil,
and adsorbs sufficiently on the rock.

In the present invention, the partial ester must have the property to disperse or possibiy to dissolve in water; thus, in the fluid, the partial ester is present in form of a solute or of a dispersion (and, in the latter case, the partial ester is dispersed as it is and not in form of a mixture with other compounds or additives).

The Applicants have observed that the partial esters used in the present invention do not interfere with the properties of the fluid, provided by other compounds or additives.

The Applicants have also observed that the partial esters used in the present invention have the capacity to directly pass into the filtrate and to adsorb on the reservoir rock. Without wanting to be bound with a theory, the Applicants think that this adsorption is the cause for the reservoir damage reduction and prevention provided by the fluid of the invention and by the use thereof in the process of the invention, as shown in the examples below.

In order to preserve this capacity to directly pass into the filtrate, the water-based fluid must not be an "O/W" emulsion type fluid, whose droplets might clog the pores of the cake.

For the same reason, the partial ester, when present in the aqueous filtrate, should not entail the formation of an emulsion between said filtrate and the reservoir oil. This property is readily determined by means of the bottle test, described hereafter, that is preferably carried out with a reservoir oil typical of the region.

The additive according to the invention can be used in a concentrated form (it can then be added at a concentration of about 1 g/l, as mentioned above) or diluted in a solvent oil (a vegetable or animal oil described above, or a mineral oil).

BRIEF DESCRIPTION OF THE DRAWINGS

Other features and advantages of the present invention will be clear from reading the following description of non limiting examples, illustrated by the attached figures

DETAILED DESCRIPTION

The polyglycerol used in the examples below has the following composition (in molar %):
glycerol : about 27% (between 24 and 30%);
diglycerol : about 31% (between 28 and 34%);
triglycerol : about 23% (between 20 and 26%);
tetraglycerol : about 12% (between 9 and 15%);
pentaglycerol : about 7% (between 4 and 10%);
ie. it has a degree of polymerization ranging between 2 and 3, in fact of about 2.4, and an average number of hydroxyl funtions of about 4.4.

It is then esterified with a mole/mole stoichiometry with a C8–C10 fatty acid to reach a mono-C8–C10 polyglycerol majority distribution called PG 8/10 below, with a free OH/esterified OH molar ratio of about 3.4:1. "C8–C10 fatty acid" is understood to be an industrial acid consisting essentially of C8 or C10 acids, but possibly also containing small quantities of heavier or lighter acids, this resulting from the natural origin and from the manufacturing process.

Tests in Porous Media:

The purpose of tests or experiments in porous media is to simulate passage of the filtrate through a reservoir rock and to study the interaction thereof on the saturations in place in the rock. Two types of experiments are conducted:

(i) simulation of passage of a reconstituted filtrate through the rock;

(ii) simulation of complete filtration of a water-based mud through a rock.

In both cases, the residual water saturation of the rock is observed to change, as is the oil permeability in the direction opposite the filtration direction (backflow).

Figure 1:
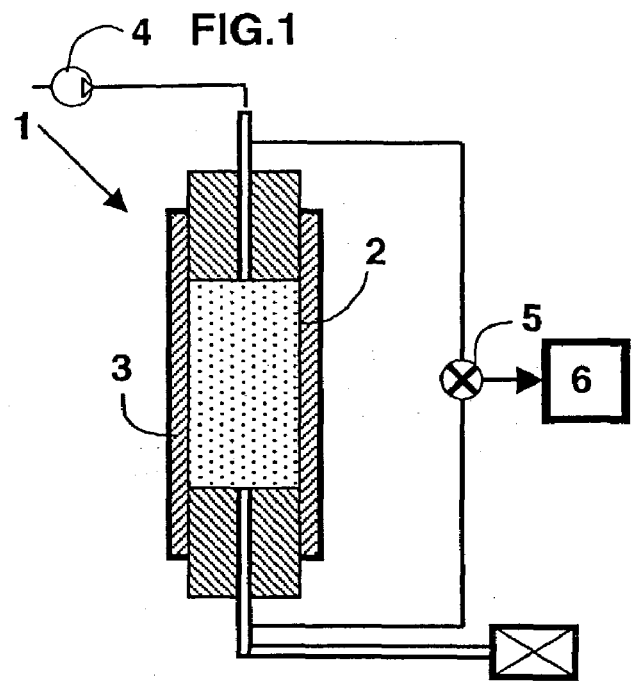
FIG. 1 shows the testing means on a sample of porous rock.

The experimental device is diagrammatically shown in FIG. 1.

The porous medium 2 is placed in a Hassler cell 1. A confining pressure of 2 MPa is applied to the medium by means of a squeeze cap 3. Brine, oil, or a simulated filtrate can be circulated in the porous medium. The flow rate of the injected solution is controlled by a Pharmacia type piston pump 4. A differential pressure sensor 5 is placed between the inlet and the outlet of the cell. The device is connected to a computer 6 which allows to calculate, among other things, the permeability of the rock to the injected liquid.

Core sample 2 is made of Clashack sandstone for experiments (i) or Vosges sandstone for experiments (ii). It has the following dimensions: length 60 mm, section 32.7 mm, pore volume Vp approximately 8.5 $cm^3$, porosity approximately 17%.

The method of operation is as follows:

(i) Simulation of Passage of a Reconstituted Filtrate Through the Rock

Three Stages are Necessary:

1) Setting up initial conditions:

The porous medium must be under conditions similar to those of the reservoir. The core sample must therefore be saturated with brine, then with oil (a) Saturating rock with brine: the core sample is saturated in a vacuum drier, then subjected to a confining pressure of 2 MPa and brine is passed therethrough (40 g/l NaCl, 5 g/l KCl) at 10 $cm^3$/h for 48 hours with 10 bars pore pressure.

(b) Measuring permeability to brine: brine is passed through the core sample at different flow rates (Q: 300, 200, 100 $cm^3$/h) and the pressure difference ($\Delta P$) between the ends of the porous medium is measured. The slope of the line $Q=f(\Delta P)$ enables the permeability of the rock to brine Kw (in miliDarcy) to be calculated.

(c) Measuring permeability to oil: injection of SOLTROL 130® oil (refined oil sold by Phillips Chemical Co. having a viscosity 0.7 mPa.s at 80° C.) at 10 $cm^3$/h for 24 hours, then gradual increase of the flow rate from 100 $cm^3$/h to 500 $cm^3$/h. The volume of water collected enables the saturation rate of the oil (So) and water (Sw) to be calculated.

Oil is then passed through the core sample at different flow rates (300, 200, 100 $cm^3$/h) and the differential pressure $\Delta P$ is measured. The slope of line $Q=f(\Delta P)$ enables the permeability of the rock to oil Ko (in milliDarcy) to be calculated.

2) Stage of invasion by the filtrate:

The solution simulating the filtrate (brine or brine+additive or brine+polymers or brine+polymers+additive) is injected at 10 $cm^3$/h. The volume of oil collected enables the new water and oil saturation rates to be calculated.

3) Well bringing in simulation stage:

Production start is simulated by backflow injection of oil (i.e. in the opposite direction to injection of the filtrate) at 10 $cm^3$/h. The volume of water collected enables the new water and oil saturation rates Sw and So to be calculated. Oil is then passed through the core sample at various flow rates (300, 200, 100 $cm^3$/h) and the differential pressure $\Delta P$ is measured. The slope of line $Q=f(\Delta P)$ enables the permeability of the rock to oil $Ko_1$ (in mD) to be calculated.

(ii) Filtration of a Water-Based Mud Through the Rock

1. Setting up initial conditions: proceed as before.

2. Dynamic filtration (600 $s^{-1}$) under pressure (3.5 MPa) and temperature:

Once saturated under the conditions of a reservoir, the core sample is placed in a dynamic filtration cell. A water-based drilling mud is then filtered, and an external and internal cake forms during filtration. This experiment is closer to real conditions because a real water-based mud filtrate, and no longer a simple simulated filtrate, passes through the core sample.

3) Well bringing in:

The core sample is then transferred into the Hassler cell and the water and oil saturations and the return permeability to oil are measured as before, by backflow injection of oil.

EXAMPLE 1

Saturation Change (Brine and Brine Plus Additive)

The tests consist in injecting a brine, to which the additive according to the invention is or is not added, into a porous medium previously saturated in the presence of oil and water under Swi (initial water saturation) conditions (type (i) test).

The results are given in the table below:

TABLE 1

|  | Sw (%) | Ko (mD) |  |
|---|---|---|---|
| Saturation with brine | 100 |  |  |
| Injection of oil | 18.1 | 775 | Initial conditions |
| After injection of filtrate (imbibition) | 55.5 |  |  |
| After backflow with Soltrol ® oil | 15.8 | 850 |  | where:
Sw is the water saturation (percentage water contained in the pore volume)
Ko is the permeability of the core sample to oil expressed in milliDarcy (in SI units, the conversion factor is: 1 Darcy=$9.87.10^{-13}$ m$^2$).

In the presence of 0.1 g/l of PG8/10 additive in the brine, the results become:

TABLE 2

|  | Sw (%) | Ko (mD) |  |
| --- | --- | --- | --- |
| Saturation with brine | 100 |  |  |
| Injection of oil | 16 | 630 | Initial conditions |
| After injection of filtrate (imbibition) | 36.7 |  |  |
| After backflow with Soltrol ® oil | 0 | 763 |  |

These filtration tests show that addition of 0.1 g/l of PG8/10 additive allows to remove most of the residual water. Addition of the additive to a brine injected into a porous medium thus enables the saturations to be changed by displacing residual water, thus leading to higher oil saturations. Note that permeability to oil also increases after backflow.

EXAMPLE 2

Saturation Change (Brine Containing Polymer in Addition)

The same experiments are conducted in the presence of 0.5 g/l of polymer (polyacrylamide PAM) to approximate the real composition of a water-based mud filtrate. In the presence of PAM alone, there is no change in residual water saturation. However, the oil permeability is decreased due to adsorption of the polymer on the rock and to clogging of its pores by the polymer aggregates. As can be seen from the example below, when PG8/10 is added, most of the residual water is displaced. Note also that the decrease in the oil permeability of the rock is less than when PAM alone is present.

TABLE 3

|  | Sw (%) | Ko (mD) |  |
| --- | --- | --- | --- |
| Saturation with brine | 100 |  |  |
| Injection of oil | 17.5 | 810 | Initial conditions |
| After injection of filtrate (imbibition) | 50.4 |  | +0.5 g/l PAM |
| After backflow with Soltrol ® oil | 15 | 693 |  |

In the presence of 0.1 g/l PG8/10 in the brine, the results become:

TABLE 4

|  | Sw (%) | Ko (mD) |  |
| --- | --- | --- | --- |
| Saturation with brine | 100 |  |  |
| Injection of oil | 15 | 738 | Initial conditions |
| After injection of filtrate (imbibition) | 40.6 |  | +0.5 g/l PAM |
| After backflow with Soltrol ® oil | 1 | 680 |  |

One may conclude that, even in the presence of polymers, addition of PG8/10 removes most of the residual water and limits the reduction in oil permeability.

EXAMPLE 3

Saturation Change (Complete Formulation)

To come closer to actual conditions, dynamic filtration is carried out, then reinstitution of well production is simulated (type (ii) test). The water-based mud formulation is called FLOPRO, it is marketed by the MI Drilling Fluids Company (USA).

Its composition is as follows:

| FLOVIS ®: | 6 g/l | (xanthan-viscosifier) |
| --- | --- | --- |
| FLOTROL ®: | 7 g/l | (starch-filtrate reducer) |
| HY-MOD PRIMA ®: | 28.5 g/l | (filler clay) |
| NaCl: | 20 g/l |  |
| KCl: | 20 g/l |  |
| IDCARB 75 ®: | 360 g/l | (carbonate) |
| pH = 8 |  |  |

The results are the following:

TABLE 5

|  | Sw (%) | Ko (mD) |  |
| --- | --- | --- | --- |
| Saturation with brine | 100 |  |  |
| Injection of oil | 36.8 | 1047 | Initial conditions |
| After injection of mud (imbibition) | 73 |  | FLOPRO |
| After backflow with Soltrol ® oil | 53 | 645 |  |

In the presence of 0.1 g/l PG8/10 in the brine, the results become:

TABLE 6

|  | Sw (%) | Ko (mD) |  |
| --- | --- | --- | --- |
| Saturation with brine | 100 |  |  |
| Injection of oil | 32.6 | 1283 | Initial conditions |
| After injection of mud (imbibition) | 57 |  | FLOPRO |
| After backflow with Soltrol ® oil | 28.6 | 845 |  |

These tests, carried out on a complete formulation, confirm the good results obtained with saturation (saturation with residual water after oil backflow of 29% in the presence of 1 g/l PG8/10 is obtained, as opposed to 53% without additive).

EXAMPLE 4

Spreading of a Drop

The goal is to show the effect of the additive on the wettability of the rock. For this purpose, spreading of a drop of oil on the surface of a rock (Claschach sandstone) immersed in a salted aqueous solution that contains or does not contain the additive according to the invention is observed.

The experimental device (FIG. 2) is a crystallizer 10 containing an aqueous solution 11 (40 g/l NaCl, 5 g/l KCl), a rock support 12, a slice of rock 13, and a drop of oil 14 (Soltrol®) deposited with a syringe 15.

The method of operation is as follows: a slice of a Claschach sandstone type rock is suspended in a salted aqueous solution that contains or does not contain the additive. After immersion for about 40 seconds, a drop of Soltrol® oil coloured with Sudan blue is introduced at the surface of the rock with a needle. The form of the drop is then observed in the presence or not of the additive according to the invention contained in the solution.

Figure 2:
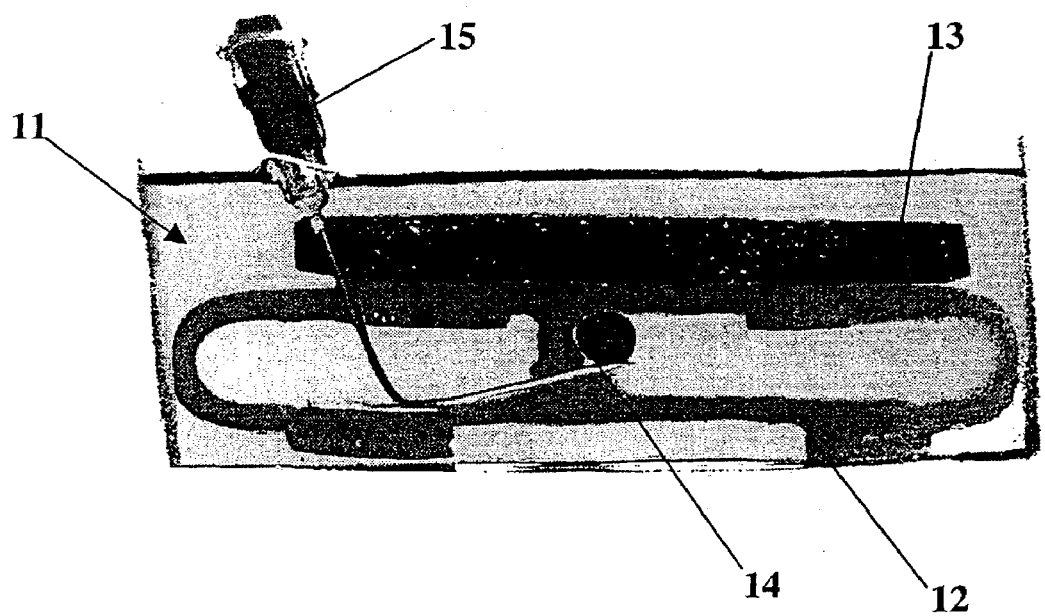
FIG. 2 is a cross section through the device allowing to display the spreading of a drop.

In the salted water alone, the oil drop is round and does not spread (FIG. 2). The rock is thus preferentially water wet. From a concentration of 0.3 g/l PG8/10 in the brine, the oil drop is observed to spread on the rock and it even penetrates it at 2 g/l of active product. These tests, not illustrated here, confirm that PG8/10 increases the oil wettability of the rock.

The surface tension (brine/air) and interfacial tension (brine/Soltrol) were measured at 25° C. The brine used contains 40 g/l NaCl and 5 g/l KCl. With no additive, the brine/air surface tension is 72 mN/m. With 100 ppm of additive, it drops to 25 mN/m. Without additive, the brine/Soltrol interfacial tension is 38 mN/m. With 10 ppm of additive it drops to 19 mN/m, reaching 14 mN/m with 15 ppm of additive. The results show that PG8/10 has a definite interfacial activity because it can reduce the surface tension of water to 25 mN/m and the brine/Soltrol interfacial tension to 14 mN/m for low concentrations, less than the CMC (critical micellar concentration) of PG8/10 which is approximately 100 ppm.

EXAMPLE 5

Test on a Long Core Sample

The efficiency of the present invention is shown by a reservoir damage simulation test conducted on 40-cm long rock samples. The details of the experiment can be found in the following document: "Performance Evaluation and Formation Damage Potential of New Water Based Drilling Formulations," Argillier J-F, Audibert A., Longeron D. SPE Drilling and Completion, 14, No. 4, 266–273, 1999. The rock used is Claschach sandstone with the following composition: 94.7% quartz, 2.6% potassium feldspar, 0.5% chlorite, and 0.7% illite (including mica). The conditions to which the sample is subjected are known as irreducible water saturation (Swi) by evacuation, saturation with brine, then injection of Soltrol 130® oil (approximately 10 pore volumes). The oil permeability of the sample is then measured (Ko at Swi). The rock sample is made to contact the drilling and/or workover fluid circulating along the front face of the sample under the following conditions: overpressure 0.35 to 2 MPa in stages of 0.5 MPa every 2 minutes, then stabilization at 2 MPa where the mud circulates at a rate of 5 l/min. During filtration, oil is produced at the end of the sample, corresponding to invasion of the core sample by the mud filtrate. The test is stopped at the filtrate breakthrough, i.e. when the first drop of filtrate comes out at the end of the core sample.

The mud used here is a formulation marketed by MI Drilling Fluids (USA) and it contains: 6 g/l Flovis® (xanthan), 7 g/l Flotrol® (starch), 20 g/l NaCl, 20 g/l KCl, and 360 g/l calcium carbonate (Test 1) to which 0.1 g/l PG8/10 may be added (Test 2).

The results of these two tests are provided in the table hereafter for comparison:

TABLE 7

|  | Test 1 | Test 2 |
|---|---|---|
| Porosity, $\phi$ (%) | 16.3 | 16.1 |
| Gas permeability, kg (mD) | 685 | 546 |
| Water permeability, Kw (mD) | 533 | 416 |
| Oil permeability at Swi, Koi (mD) | 452 | 281 |
| Oil permeability after backflow, Koi (mD) | 176 | 206 |
| % return permeability RP | 39 | 73 |
| Sw after backflow (%) | 27.8 | 29.5 |

We observe a significant difference in return permeability (after backflow) when PG8/10 is added to the mud, particularly in the first few centimeters of the core sample. This indicates that, during backflow, the porous medium once more becomes more easily saturated with oil in the case of mud with the presence of additive. Thus, the additive entrained with the filtrate preferentially clogs the adsorption sites, thus limiting adsorption/retention of polymers contained in the mud and hence entrained with the filtrate into the porous medium. This limits clogging or shrinking of the pores by polymers, thus improving oil permeability.

EXAMPLE 6

Passage of Additive Through the Cake

Since the additive is added to the drilling fluid or to the well fluid, it is essential for it to be able to penetrate the permeable rock formation. In the case of a drilling fluid, it is essential for the molecule to be able to pass through the cake into the filtrate. Passage of the molecule through the cake was therefore studied. The tests presented below were conducted on GREEN BOND (70 g/l GREEN BOND®, bentonite marketed by the SBF company; 1 g/l of PAC LV, an anionic low-viscosity cellulose polymer, 1 g/l NaCl), and FLOPRO muds (Example 3).

First, the muds are centrifuged with and without PG8/10 to find out the adsorption of PG8/10 and polymers on the clay. Also, the muds are filtered for 30 minutes at 0.7 MPa and room temperature. All the solutions obtained are subjected to TOC analysis in order to establish a material balance in ppm of carbon. To find out the correspondence between the ppm of molecule and of carbon, the PG8/10 calibration curve was obtained.

For the Green Bond® mud, the results show that 35% of the GP8/10 adsorbs on clay and of the remaining 65%, 84% passes through the cake.

For Flopro® mud, the material balance is more complex because of the presence of the polymers that contribute to the carbon value measured in the filtrate. Even so, when PG8/10 is used, there is a sharp increase in carbon in the filtrate, due largely to the presence of PG8/10 in the filtrate.

These tests show that part of the PG8/10 molecules passes through the cake and is thus available for modifying the saturations in the oil formation.

EXAMPLE 7

Compatibility with the Constituents of a Drilling Mud

The compatibility of the product with the various constituents of a mud was tested. For this purpose, the properties of the mud containing the additive were studied in terms of rheology and filtration.

The results of this study on the Green Bond® and Flopro® muds with and without PG8/10, before (A-V) and after (P-V) aging, are summarized in the table below:

TABLE 8

|  |  | GREEN BOND mud | | | | FLOPRO mud | | | |
|---|---|---|---|---|---|---|---|---|---|
|  |  | A–V | | P–V | | A–V | | P–V | |
|  |  | without PG8/10 | with PG8/10 | without PG8/10 | with PG8/10 | without PG8/10 | with PG8/10 | without PG8/10 | with PG8/10 |
| Viscosity study | AV | 36 | 38 | 33 | 34 | 9 | 7 | 16 | 15 |
|  | PV | 16 | 13 | 14 | 15 | 6 | 66 | 12 | 11 |
|  | YV | 40 | 42 | 38 | 38 | 6 | 2 | 8 | 8 |
|  | Gel | 24\26 0\10 | 21\27 | 22\24 | 20\24 | 5\10 | –\– | 12\6 | 5\– |
| Filtration | Volume filtered 30 min | 8 ml | 8 ml | 7 ml | 7 ml | 14 ml | 14 ml | 14 ml | 14 ml |

AV: apparent viscosity in centipoise;
PV: plastic viscosity in centipoise (1 centipoise = 0.001 Pa · s)
YV: yield value in lb/100 ft$^2$.

Addition of 1 g/l PG8/10 does not significantly affect the filtration or rheology properties of the muds tested, which shows that such an additive, as defined in the present invention, is compatible with the conventional constituents of drilling and/or workover fluids.

EXAMPLE 8

Bottle Test

In order to avoid any additional damage at the well bore, it is necessary to evaluate if any in situ emulsion can be generated between reservoir fluids (brine, oil) and the mud filtrate.

Thus, one of the conditions is that the water-based mud filtrate is compatible with the reservoir fluids.

The proportion of each phase is varied in order to plot a ternary diagram. Emulsion formation and stability are determined by means of the so-called "bottle test" as described hereunder.

Brine (NaCl 20 g/l), an organic phase, i.e., oil reservoir constituting reservoir fluids, are put into contact with a mud filtrate containing the additive of this invention. The filtrate is constituted from water, salts, and polymers (xanthan 0.5 g/l, starch 0.5 g/l). A mixture A composed of 80 ml of reservoir oil and 20 ml of aqueous phase and a mixture B composed of 60 ml of reservoir oil and 40 ml of aqueous phase are prepared.

The aqueous phase is composed of brine (reservoir fluid) and mud filtrate containing 1 g/l of the additive here described with the following proportions 25/75, 50/50 and 75/25 by volume. The agitation is performed with a magnetic stirrer for a reservoir oil (low agitation during the drop by drop addition, followed by a high speed agitation during 15 min.) or with an Hamilton Beach for a model oil (low speed agitation during the drop by drop addition, followed by an agitation period of 15 min. at the same speed). The emulsion is transferred in a flask and it is observed whether the emulsion breaks or not.

Results are obtained with the following additives used at a concentration of 1 g/l.

1. Polyglycerol mono oleate (C18)
2. Polyglycerol mono myristate (C14)
3. Polyglycerol mono laurate (C12)
4. Polyglycerol mono C8–C10
5. Polyglycerol mono hexanoate (C6)

The reservoir oil is a real one with the following properties:
Density (20° C.): 850 kg/m3
Viscosity (20° C.): 8.3 cP
Composition (SARA method):

| Saturated: | 56% |
|---|---|
| Aromatics: | 38% |
| Resins: | 6% |
| Asphaltenes: | 0.26% |

Some tests have been performed with a model oil (Soltrol 130 ®), which contains no natural surfactants.

The risk of emulsion is indicated in the following table (observation performed after 16 hours unless otherwise indicated).

TABLE 9

| System | % filtrate in the aqueous phase | Mixture A (80/20) aspect of the emulsion | Mixture B (60/40) aspect of the emulsion |
|---|---|---|---|
| No additive | 0 | W/O emulsion (20% by volume) | W/O emulsion large distribution droplet size (40% by volume) |
| No additive | 25 | W/O emulsion | W/O emulsion homogeneous (20% by volume) |
| No additive | 50 | homogeneous W/O emulsion | W/O emulsion large distribution droplet size (40% by volume) |
| No additive | 75 | homogeneous W/O emulsion | W/O emulsion large distribution droplet size (40% by volume) |
| 1 | 25 | separation of phase (17% water) | separation of phase (13% water after 30 minutes) |
| 1 | 50 | separation of phase (17% water) | separation of phase (13% water after 30 minutes) |
| 1 | 75 | separation of phase (17% water) | separation of phase (13% water after 30 minutes) |
| 2 | 25 | separation of phase (17% water) | separation of phase (13% water after 30 minutes) |
| 2 | 50 | separation of phase (17% water) | separation of phase (13% water after 30 minutes) |
| 2 | 75 | separation of phase (17% water) | separation of phase (13% water after 30 minutes) |
| 3 | 25 | separation of phase (17% water) | separation of phase (13% water after 30 minutes) |
| 3 | 50 | separation of phase (17% water) | separation of phase (13% water after 30 minutes) |

TABLE 9-continued

| System | % filtrate in the aqueous phase | Mixture A (80/20) aspect of the emulsion | Mixture B (60/40) aspect of the emulsion |
|---|---|---|---|
| 3 | 75 | separation of phase (17% water) | separation of phase (13% water en 30 minutes) |
| 4 | 25 | 6% emulsion large distribution droplet size + water | separation of phase (13% water after 30 minutes) |
| 4 | 50 | 8% emulsion large distribution droplet size + water | separation of phase (13% water after 30 minutes) |
| 4 | 75 | 10% emulsion large distribution droplet size + water | separation of phase (13% water after 30 minutes) |
| 5 | 25 | 17% emulsion large distribution droplet size + water | emulsion large distribution droplet size (17% by volume after 1 hour) |
| 5 | 50 | 17% emulsion large distribution droplet size + water | separation of phase (13% water after 1 hour) |
| 5 | 75 | 17% emulsion large distribution droplet size + water | separation of phase (13% water after 1 hour) |

In all the cases, the presence of the additive within the filtrate induces the emulsion breaking if any. The longer the alkyl chain, the faster the breaking.

The results of the additional tests performed with a model oil, SOLTROL 130 ®, are summarized in the following table:

TABLE 10

| System | % filtrate in the aqueous phase | Mixture B (60/40) |
|---|---|---|
| No additive | 0 | Total separation |
| No additive | 50 | Total separation: aqueous phase and organic phase trouble |
| 1 | 50 | Total separation: aqueous phase and organic phase trouble |
| 2 | 50 | Total separation: aqueous phase and organic phase trouble |
| 3 | 50 | Total separation: aqueous phase and organic phase trouble |
| 4 | 50 | Total separation: aqueous phase and organic phase trouble |
| 5 | 50 | Total separation: aqueous phase and organic phase trouble |

These results confirm the previous ones: the additive does not induce the emulsion formation between the oil and the aqueous phase.

It was further observed that, in the absence of stirring, the additives corresponding to the longer acid chains have the tendency of forming light white precipitates, this denoting approaching the solubility limit. Such a phenomenon can cause interactions with the other components of the mud.

The invention claimed is:

1. A method for drilling or workover in a well passing through a porous permeable formation, comprising:
providing a water-based well fluid that is not an oil-in-water emulsion,
adding to the water-based well fluid at most 3% by weight of one or more compounds selected from the group consisting of partial esters of polyglycerol and C8–C10 fatty acids in an amount sufficient to prevent damage of the porous permeable formation, by passing directly into a filtrate on reservoir rock in the formation and be sufficiently adsorbed on the reservoir rock, and
circulating the water-based well fluid in the well.

2. The method as claimed in claim 1, wherein the water-based well fluid contains at most 0.1% by weight of the one or more compounds selected from the group consisting of partial esters of polyglycerol and C8–C10 fatty acids.

3. A water-based well fluid comprising a water-based fluid that is not an oil-in-water emulsion and containing at most 1g/l of one or more compounds selected from the group consisting of partial esters of polyglycerol and C8–C10 fatty acids that passes directly into a filtrate on reservoir rock in the formation and be sufficiently adsorbed on the reservoir rock.

4. The water-based well fluid as claimed in claim 3, wherein the polyglycerol has the following composition: between 24 and 30 molar % glycerol; between 28 and 34 molar % diglycerol; between 20 and 26 molar % triglycerol; between 9 and 15% tetraglycerol; and between 4 and 10 molar % pentaglycerol.

5. The water-based well fluid as claimed in claim 4 wherein the polyglycerol has the following composition: 27 molar % glycerol; 31 molar % diglycerol; 23 molar % triglycerol; 12 molar % tetraglycerol; and 7 molar % pentaglycerol.

6. The fluid-water-based fluid as claimed in claim 3, wherein, in the partial ester, the molar ratio of the number of free hydroxyl groups to the number of hydroxyl groups esterified by a fatty acid is at least 1:1.

7. The water-based well fluid as claimed in claim 3, wherein, in the partial ester, the molar ratio of the number of free hydroxyl groups to the number of hydroxyl groups esterified by a fatty acid is at least 2:1.

8. The water-based well fluid as claimed in claim 3, wherein, in the partial ester, the molar ratio of the number of free hydroxyl groups to the number of hydroxyl groups esterified by a fatty acid is at least 3:1.

9. The water-based well fluid as claimed in claim 3 further comprising at least one material selected from the group consisting of filtrate reducers, viscosifiers, and weighting materials.

10. A method for reducing and preventing damage of a porous permeable formation in a well, comprising:
providing a water-based well fluid that is not an oil-in-water emulsion,
adding to the water-based well fluid at most 3% by weight of one or more compounds selected from the group consisting of partial esters of polyglycerol and C8–C10 fatty acids, and
circulating the water-based well fluid in the well so that at least some of said one or more compounds pass directly into a filtrate on reservoir rock in the formation and be sufficiently adsorbed on the reservoir rock.

11. The method as claimed in claim 10, wherein the polyglycerol has the following composition: between 24 and 30 molar % glycerol,; between 28 and 34 molar % diglycerol; between 20 and 26 molar % triglycerol; between 9 and 15 molar % tetraglycerol; and between 4 and 10 molar % pentaglycerol.

12. The method as claimed in claim 11, wherein the polyglycerol has the following composition: 27 molar % glycerol, 31 molar % diglycerol, 23 molar % triglycerol, 12 molar % tetraglycerol and 7 molar % pentaglycerol.

13. The method as claimed in claim 10, wherein, in the partial ester, the molar ratio of the number of free hydroxyl groups to the number of hydroxyl groups esterified by a fatty acid is at least 1:1.

14. The method as claimed in claim 10, wherein said water-based well fluid contains at most 1 g/l of said one or more compounds.

15. The method as claimed in claim 10, wherein, in the partial ester, the molar ratio of the number of free hydroxyl groups to the number of hydroxyl groups esterified by a fatty acid is at least 2:1.

16. The method as claimed in claim 10, wherein, in the partial ester, the molar ratio of the number of free hydroxyl groups to the number of hydroxyl groups esterified by a fatty acid is at least 3:1.

17. The method according to claim 10 wherein said well fluid further comprises at least one material selected from the group consisting of filtrate reducers, viscosifiers, and weighting materials.

18. The method as claimed in claim 10, wherein the water-based well fluid contains at most 0.1% by weight of the one or more compounds selected from the group consisting of partial esters of polyglycerol and C8–C10 fatty acids.

19. A water-based well fluid characterized in that the water-based fluid is not an oil-in-water emulsion ,comprising at most 3% by weight of an ester of a polyglycerol and C8–C10 fatty acid, the polyglycerol having the following composition: between 24 and 30 molar % glycerol; between 28 and 34 molar % diglycerol; between 20 and 26 molar % triglycerol; between 9 and 15 molar % tetraglycerol; and between 4 and 10 molar % pentaglycerol.

20. The water-based well fluid as claimed in claim 19 wherein the polyglycerol has the following composition: 27 molar % glycerol; 31molar % diglycerol; 23 molar % triglycerol; 12 molar % tetraglycerol; and 7 molar % pentaglycerol.

21. The water-based well fluid as claimed in claim 19 further comprising at least one material selected from the group consisting of filtrate reducers, viscosifiers, and weighting materials.

22. The fluid according to claim 19, wherein, in the partial ester, the molar ratio of the number of free hydroxyl groups to the number of hydroxyl groups esterified by a fatty acid is at least 1:1.

23. The fluid as claimed in claim 19, wherein, in the partial ester, the molar ratio of the number of free hydroxyl groups to the number of hydroxyl groups esterified by a fatty acid is at least 2:1.

24. The fluid as claimed in claim 19, wherein, in the partial ester, the molar ratio of the number of free hydroxyl groups to the number of hydroxyl groups esterified by a fatty acid is at least 3:1.

25. A method for drilling or workover in a well passing through a porous permeable formation, comprising:
providing a water-based well fluid that is not an oil-in-water emulsion,
adding to said fluid at most 3% by weight of one or more compounds selected from the group consisting of partial esters of polyglycerol and C8–C10 fatty acids, in an amount sufficient to prevent damage of the porous permeable formation, the polyglycerol having the following composition: between 24 and 30 molar % glycerol; between 28 and 34 molar % diglycerol; between 20 and 26 molar % triglycerol; between 9 and 15 molar % tetraglycerol; and between 4 and 20 molar % pentaglycerol, and
circulating the water-based well fluid in the well.

26. The method as claimed in claim 25, wherein, in the partial ester, the molar ratio of the number of free hydroxyl groups to the number of hydroxyl groups esterified by a fatty acid is at least 1:1.

27. The method as claimed in claim 25, wherein the polyglycerol has the following composition: 27 molar % glycerol, 31 molar % diglycerol, 23 molar % triglycerol, 12 molar % tetraglycerol and 7 molar % pentaglycerol.

28. The method as claimed in claim 25, wherein, in the partial ester, the molar ratio of the number of free hydroxyl groups to the number of hydroxyl groups esterified by a fatty acid is at least 2:1.

29. The method as claimed in claim 25, wherein, in the partial ester, the molar ratio of the number of free hydroxyl groups to the number of hydroxyl groups esterified by a fatty acid is at least 3:1.

30. The method according to claim 25 wherein said water-based well fluid further comprises at least one material selected from the group consisting of filtrate reducers, viscosifiers, and weighting material.

31. A method for reducing and preventing damage of a porous permeable formation in a well, comprising:
providing a water-based fluid that is not an oil-in-water emulsion,
adding to said fluid at most 3% by weight of one or more compounds selected from the group consisting of partial esters of polyglycerol and C8–C10 fatty acids, the polyglycerol having the following composition: between 24 and 30 molar % glycerol; between 28 and 34 molar diglycerol; between 20 and 26 molar % triglycerol; between 9 and 15 molar % tetraglycerol; and between 4 and 10 molar % pentaglycerol, and
circulating water-based well fluid in said well.

32. The method as claimed in claim 31, wherein, in the partial ester, the molar ratio of the number of free hydroxyl groups to the number of hydroxyl groups esterified by a fatty acid is at least 1:1.

33. The method as claimed in claim 31, wherein the polyglycerol has the following composition: 27 molar % glycerol, 31 molar % diglycerol, 23 molar % triglycerol, 12 molar % tetraglycerol and 7 molar % pentaglycerol.

34. The method as claimed in claim 31, wherein said water-based well fluid contains at most 1 g/l of said composition.

35. The method as claimed in claim 31, wherein, in the partial ester, the molar ratio of the number of free hydroxyl groups to the number of hydroxyl groups esterified by a fatty acid is at least 2:1.

36. The method as claimed in claim 31, wherein, in the partial ester, the molar ratio of the number of free hydroxyl groups to the number of hydroxyl groups esterified by a fatty acid is at least 3:1.

37. The method according to claim 31 wherein said water-based well fluid further comprises at least one material selected from the group consisting of filtrate reducers, viscosifiers, and weighting material.

* * * * *